United States Patent
Okuda et al.

(10) Patent No.: US 12,111,160 B2
(45) Date of Patent: Oct. 8, 2024

(54) METHOD AND APPARATUS FOR NAVIGATION PLANNING

(71) Applicant: Furuno Electric Co., Ltd., Nishinomiya (JP)

(72) Inventors: Masato Okuda, Kyoto (JP); Shinji Ishihara, Kyoto (JP)

(73) Assignee: FURUNO ELECTRIC CO., LTD., Nishinomiya (JP)

( * ) Notice: Subject to any disclaimer, the term of this patent is extended or adjusted under 35 U.S.C. 154(b) by 138 days.

(21) Appl. No.: 17/485,513

(22) Filed: Sep. 27, 2021

(65) Prior Publication Data
US 2022/0397399 A1    Dec. 15, 2022

(30) Foreign Application Priority Data

Jun. 15, 2021 (JP) ................................. 2021-099670
Jun. 29, 2021 (EP) ...................................... 21182505

(51) Int. Cl.
*G01C 21/20* (2006.01)
*B63B 49/00* (2006.01)

(52) U.S. Cl.
CPC ............ *G01C 21/203* (2013.01); *B63B 49/00* (2013.01)

(58) Field of Classification Search
None
See application file for complete search history.

(56) References Cited

U.S. PATENT DOCUMENTS 7,268,703 B1 *  9/2007  Kabel ................. G01C 21/203
                                                   340/984
10,077,983 B2 *  9/2018  Okuda .................... G01C 21/20
(Continued)

FOREIGN PATENT DOCUMENTS

JP    2018-150024 A    9/2018
JP    6762674 B2 *    9/2020    ............... B43L 9/12
WO    2016/020878 A1    2/2016

OTHER PUBLICATIONS

Extended European search report issued on Dec. 22, 2021, in corresponding European patent Application No. 21182505.4.8, 9 pages.

*Primary Examiner* — Aniss Chad
*Assistant Examiner* — Mahmoud M Kazimi
(74) *Attorney, Agent, or Firm* — XSENSUS LLP

(57) ABSTRACT

A navigation planning method and apparatus comprising a chart data receiving terminal configured to receive a chart data including position information of one or a plurality of targets; a waypoint receiving terminal configured to receive a plurality of waypoints including a latest waypoint for a navigation route of a movable body; a potential waypoint receiving terminal configured to receive a potential waypoint being movable on the chart; and processing circuitry configured to: determine a position of the potential waypoint as a next waypoint following the latest waypoint, the potential waypoint being movable, wherein the potential waypoint is determined by: receive a current position data of the potential waypoint; receive position information of the plurality of targets located within a predetermined distance from the current position of the potential waypoint; calculate an angle between a first bar and a second bar on the chart, wherein the first bar is to connect the latest waypoint with the potential waypoint and the second bar is to connect the potential waypoint with the plurality of targets; and output an activating signal when the calculated angle is equal to a predetermined value.

19 Claims, 8 Drawing Sheets

(56) References Cited

U.S. PATENT DOCUMENTS

| | | | | |
|---|---|---|---|---|
| 2015/0330803 A1* | 11/2015 | Okuda | ................... | G01C 21/20 |
| | | | | 701/538 |
| 2015/0330804 A1* | 11/2015 | Okuda | ................. | G09B 29/007 |
| | | | | 701/487 |
| 2017/0254649 A1* | 9/2017 | Carnevali | .............. | G01C 21/20 |

* cited by examiner

METHOD AND APPARATUS FOR NAVIGATION PLANNING

CROSS-REFERENCE TO RELATED APPLICATIONS

The application claims priority under 35 U.S.C. § 119 to Japanese Patent Application No. P2021-099670, which was filed on Jun. 15, 2021, and European Patent Application No. EP21182505.4, which was filed on Jun. 29, 2021, the entire disclosures each of which are hereby incorporated by reference.

BACKGROUND

Technical Field

An example embodiment of the present application generally relates to a navigation planning apparatus for planning a navigation route.

Background of the Related Art

An Electronic Chart Display and Information System (ECDIS) displays navigation route information for one or more vessels, where the one or more vessels are navigating through a water body, for example a river, or a sea or the like. The ECDIS displays a chart of desired area on a display by performing software processing of electronic chart data. The ECDIS may comprise a touch sensitive display screen. Therefore, the navigation route can be set on the chart displayed on the touch display screen by touching desired locations on the chart or by moving a cursor. The navigation route is established by determining a navigation starting point (a starting point) and a navigation destination point (a destination point) of the vessel, and in an interval, determining one or more points called "waypoint" through which the vessel should pass. These waypoints must be accurately located to not cause obstruction to the vessel on the navigation route. When determining position of the waypoints, it is to be ensured that there are no obstructions such as a buoy, a lighthouse or the like near the navigation route of the vessel. Therefore, when there are obstructions (also referred as a target) such as the lighthouse or the buoy near the navigation route, the position of the waypoint is set based on a distance from the target and a bearing thereby ensuring that the navigation route is safe from dangerous areas such as land and shallow water.

In the conventional systems, when measuring the distance and the direction of the waypoint to be set from the target, it is necessary to set the navigation route while confirming the distance and the position every time the position of the waypoint is changed by using a separate tool. The tool obtains the distance and the direction separately from input of the position of the waypoint. For example, in JP-PA-2018-150024, the navigation route planning system generates a route line by connecting sequentially selected previous waypoints to a current waypoint being entered. Further, in order to set the next waypoint from a latest set waypoint i.e., the current waypoint, a guideline value is displayed at the position of the latest waypoint along with azimuth. Additionally, since the conventional navigation apparatus displays only the guideline value for finding the next waypoint, it is not possible to dynamically change positions of the waypoint and obtain distance of the target along with the azimuth in real time. Further, there is no means in the prior art for a user to operate a line indicating the azimuth and a scale indicating the distance of the target, and to superimpose the line on the target object, which is troublesome.

Therefore, there is a need for a navigation apparatus capable of determining position of a potential waypoint such that the position of the potential waypoint is within a prescribed angle and distance from the target thereby efficiently setting a safe navigation route for the vessel.

SUMMARY

A navigation planning apparatus comprising: a chart data receiving terminal configured to receive a chart data, wherein the chart data includes position information of one or a plurality of targets; a waypoint receiving terminal configured to receive a plurality of waypoints including a latest waypoint for a navigation route of a movable body; a potential waypoint receiving terminal configured to receive a potential waypoint, the potential waypoint being movable on the chart; and processing circuitry configured to: determine a position of the potential waypoint as a next waypoint following the latest waypoint, the potential waypoint being movable. Here, the potential waypoint is determined by: receive a current position data of the potential waypoint; receive position information of the plurality of targets; calculate an angle between a first bar and a second bar on the chart, wherein the first bar is to connect the latest waypoint with the potential waypoint and the second bar is to connect the potential waypoint with the plurality of targets; and output an activating signal when the calculated angle is equal to a predetermined value.

According to an example embodiment, the navigation planning apparatus further comprise a waypoint fixing terminal configured to generate a waypoint fix signal upon receiving the activating signal; and the position specifying unit is further configured to add the potential waypoint to the navigation route based on the waypoint fix signal.

According to an example embodiment, the predetermined value is preset and the predetermined value is equal to 90 degrees.

According to an example embodiment, the processing circuitry further configured to: calculate a distance between the potential waypoint and the target which the calculated angle is equal to the predetermined value; and output the distance.

According to an example embodiment, the position specifying terminal is further configured to calculate an intersection position of two circles, where first circle is a circle having a diameter of a line connecting the target and the latest waypoint, and the second circle is a circle having a radius of a given distance around the target; and output the calculated intersection position to indicate the distance between the potential waypoint and the target.

According to an example embodiment, the navigation planning apparatus further comprises a display, where the display is one or more of a touch screen display, and an Electronic Chart Display Information System (ECDIS) configured to receive at least one of touch based input and a mouse based input, the display configured to: display chart information and position information of one or a plurality of targets; display the plurality of waypoints and the potential waypoint; display the first bar and the second bar; change one or more of color, contrast, thickness or aspect of the first bar or the second bar based on the activation signal; and display a line or a plurality of dots arranged to form a circle, where circumference of the circle is to connect the potential waypoint with the target.

According to an example embodiment, a navigation planning method is provided, comprising: receiving, a chart data, where the chart data includes position information of one or a plurality of targets; receiving, a plurality of waypoints including a latest waypoint for a navigation route of a movable body; receiving, a potential waypoint, the potential waypoint being movable on the chart; and where the navigation planning method is characterized by: determining a position of the potential waypoint, as a next waypoint following the latest waypoint, the potential waypoint being movable, where the potential waypoint is determined by: receiving a current position data of the potential waypoint; receiving position information of the plurality of targets located within a predetermined distance from the current position of the potential waypoint; calculating an angle between a first bar and a second bar on the chart, where the first bar is to connect the latest waypoint with the potential waypoint and the second bar is to connect the potential waypoint with the plurality of targets; and outputting an activating signal when the calculated angle is equal to a predetermined value.

According to an example embodiment, navigation planning method further comprises generating, a waypoint fix signal upon receiving the activating signal; and adding the potential waypoint to the navigation route based on the waypoint fix signal.

According to an example embodiment, the navigation planning method further comprises calculating an intersection position of two circles, where first circle is a circle having a diameter of a line connecting the target and the latest waypoint, and second circle is a circle having a radius of a given distance around the target; and outputting the calculated intersection position to indicate a potential waypoint at a predetermined distance from the target can be determined.

The foregoing summary is illustrative only and is not intended to be in any way limiting. In addition to the illustrative aspects, embodiments, and features described above, further aspects, embodiments, and features will become apparent by reference to the drawings and the following detailed description.

In various embodiments, an apparatus, and a method for planning a navigation route for a vessel or an aircraft is provided. The navigation planning apparatus enables efficient determination of waypoints that are located at a prescribed angle and distance of interest from a target in a navigation route thereby ensuring safe navigation for the vessel or the aircraft.

BRIEF DESCRIPTION OF THE DRAWINGS

The drawing is illustrated by way of example and not by way of limitation in the figures of the accompanying drawings, in which the like reference numerals indicate like elements.

DETAILED DESCRIPTION

Figure 1A:
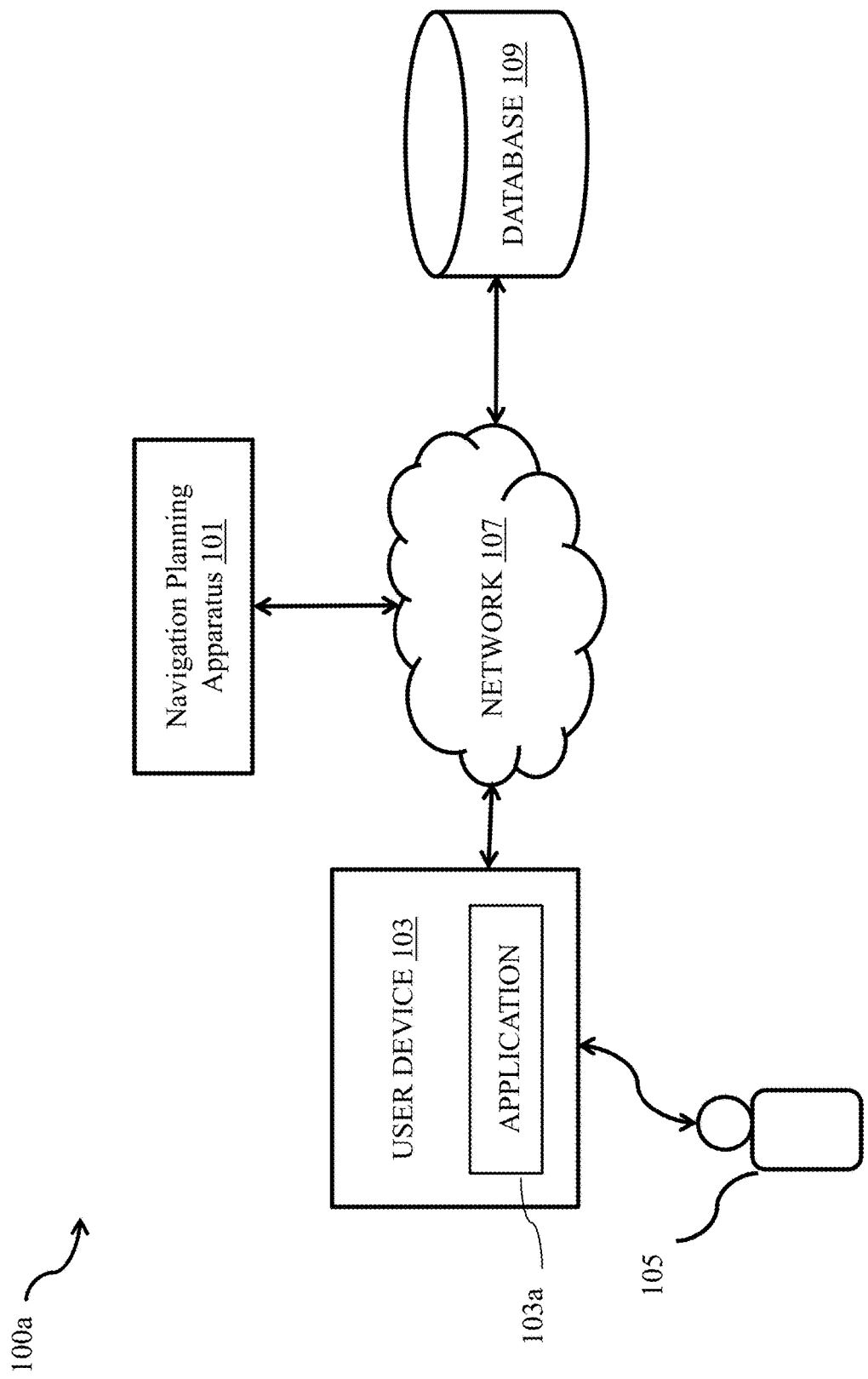
FIG. 1A is a schematic diagram that exemplarily illustrates working environment of a navigation planning apparatus, in accordance with an example embodiment.

In the following description, for purposes of explanation, numerous specific details are set forth in order to provide a thorough understanding of the present application. It will be apparent, however, to one skilled in the art that the present application may be practiced without these specific details. In other instances, systems and methods are shown in block diagram form only in order to avoid obscuring the present application.

Some embodiments of the present application will now be described more fully hereinafter with reference to the accompanying drawings, in which some, but not all, embodiments of the application are shown. Indeed, various embodiments of the application may be embodied in many different forms and should not be construed as limited to the embodiments set forth herein; rather, these embodiments are provided so that this application will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present application. Further, the terms "processor", "controller", "processing part", and "processing circuitry" and similar terms may be used interchangeably to refer to the processor capable of processing information in accordance with embodiments of the present application. Further, the terms "electronic equipment", "electronic apparatuses" and "apparatuses" are used interchangeably to refer to electronic equipment monitored by the system in accordance with embodiments of the present application. Thus, use of any such terms should not be taken to limit the spirit and scope of embodiments of the present application.

The embodiments are described herein for illustrative purposes and are subject to many variations. It is understood that various omissions and substitutions of equivalents are contemplated as circumstances may suggest or render expedient but are intended to cover the application or implementation without departing from the spirit or the scope of the present application. Further, it is to be understood that the phraseology and terminology employed herein are for the purpose of the description and should not be regarded as limiting. Any heading utilized within this description is for convenience only and has no legal or limiting effect.

As used in this specification and claims, the terms "for example" "for instance" and "such as", and the verbs "comprising," "having," "including" and their other verb forms, when used in conjunction with a listing of one or more components or other items, are each to be construed as open ended, meaning that that the listing is not to be considered as excluding other, additional components or items. Other terms are to be construed using their broadest reasonable meaning unless they are used in a context that requires a different interpretation.

One of the objectives of the present application is to determine a safe route for a vessel or an aircraft during navigation. The navigation route should be set such that the vessel does not get stuck in land or in shallow waters present in water body. The water body may comprise a sea, an ocean, a river, or the like. The safe navigation route ensures a vessel on the navigation route avoids shallow waters and land in the water body. To ensure that the vessel navigating the water body avoids shallow waters, mud, land or the like, it is important to set navigation route that is at a certain distance away from the plurality of targets. Further, in case the vessel is required to reach shore, it is important to set a waypoint on the navigation route that is perpendicular to the plurality of targets to ensure that bearing of the ship is at 90 degrees thereby enabling the ship to reach the shore efficiently. The navigation route is determined by a navigation planning apparatus by determining position of a potential waypoint on an electronic chart by referring to a target such as a lighthouse or a buoy near the route. The electronic chart comprises positional information related to the target. Further, position of the potential waypoint is set on the basis of a distance from the target and the bearing. By doing so, it is possible to confirm that the route is safe and directed to a destination away from dangerous areas such as land and shallow water. The potential waypoint is subsequently added to the navigation route comprising a plurality of waypoints. The waypoints may not necessarily be route origination and route destination points but may be any passing point or any arbitrary point that is used for setting up the navigation route.

Further, the navigation planning apparatus is configured to receive a potential waypoint and determine position of the potential waypoint as a next waypoint following a latest waypoint. The potential waypoint is movable on the electronic chart. A position of the potential waypoint is selected tentatively. The tentative position of the potential waypoint can be moved or adjusted in order to optimize the navigation route by simple drag and drop or by moving back and forth on the display screen. Further, the position of the potential waypoint is set with reference to the plurality of targets such that the potential waypoint is at a prescribed angle and distance from the target that is nearby the potential waypoint. The prescribed angle is an angle formed between a first bar that connects the latest waypoint with the potential waypoint and a second bar that connects the potential waypoint with the target. When the position of the potential waypoint is changed, the first bar and the second bar is also configured to move along. Further, when the potential waypoint is determined, the navigation apparatus is configured to output an activating signal such that the visual display of the first bar and the second bar is changed to denote that the potential waypoint is at the prescribed angle.

The processing circuitry further configured to calculate a distance between the potential waypoint and the target which the calculated angle is equal to the predetermined value and output the distance so that a user judge if the current potential waypoint is far enough from the target.

Further, the navigation apparatus provides a waypoint fix signal upon receiving the activating signal so that the potential waypoint is added to the navigation route of the vessel.

In this way, the navigation planning apparatus allows accurate determination of the waypoints and consequently enables determining an optimized navigation route that is safe for navigation.

FIG. 1A is a schematic diagram that exemplarily illustrates working environment 100a of a navigation planning apparatus 101, in accordance with an example embodiment. In an example embodiment, the navigation planning apparatus 101 is installed at a vessel navigating in a water body. In an example embodiment, the navigation planning apparatus 101 may be installed on an aircraft. The navigation planning apparatus 101 installed on the vessel may be used to determine a safe navigation route in the water body. The navigation planning apparatus 101 may obtain inputs from a user 105, where the inputs may comprise position information of a plurality of waypoints including a latest waypoint and position information of a potential waypoint (not shown in Figure) in between the latest waypoint point and a target. The position information may comprise position data such as longitude or latitude, direction data, or GPS coordinates, distance from latest waypoint, distance from the target, or the like. The navigation planning apparatus 101 is communicatively coupled with a user device 103, and a database 109, via a network 107.

The user device 103 comprises an application 103a installed in it, where the application 103a displays different information associated with navigation for the user 105 operating the user device 103. The user device 103 may be any user accessible apparatus such as a smartphone, a portable computer, a display unit, or the like. In an example embodiment, the user device 103 may include Electronic Chart Display and Information System (ECDIS). The user device 103 uses the application 103a to display different navigation information such as sea maps, tidal currents of the sea, or the like on a display screen of the user device 103. In an example embodiment, the user device 103 may be configured with a touch screen display.

Further, the database 109 may store updated navigation maps, latest information about the weather forecast, information about the tidal currents, nautical charts that may be used by the vessel for navigating in the water body and determining a safe navigation route. The database 109 may further comprise dangerous locations in the water body such as location of a whirlpool, shallow waters, mud, land or the like. The database 109 may comprise navigation data such as information on plurality of targets such as a buoy, a light house or the like, information related to salinity, water temperature and air temperature, atmospheric pressure, and wind (speed, gusts, and direction), geographical location in terms of longitude and latitude of the vessel, or the like. The database 109 may also comprise updated navigation maps, latest information about the weather forecast, or the like that may be used by an aircraft.

In alternate embodiments, the database 109 may be embodied as a map database and may represent a compiled navigation database that may be used in or with the user device 103 to provide navigation and/or map-related functions to the user 105. In such a case, the database 109 may be downloaded or stored on the user device 103.

The network 107 may comprise suitable logic, circuitry, and interfaces that may be configured to provide a plurality of network ports and a plurality of communication channels for transmission and reception of data, such as selected positions of navigation start point S, navigation destination point D, plurality of waypoints (103b, 103c, . . . , 103f) or the like. Each network port may correspond to a virtual address (or a physical machine address) for transmission and reception of the communication data. For example, the virtual address may be an Internet Protocol Version 4 (IPv4) (or an IPv6 address) and the physical address may be a Media Access Control (MAC) address. The network 107 may be associated with an application layer for implementation of communication protocols based on one or more communication requests from at least one of the one or more communication apparatuses. The communication data may be transmitted or received, via the communication protocols. Examples of such wired and wireless communication protocols may include, but are not limited to, Transmission Control Protocol and Internet Protocol (TCP/IP), User Datagram Protocol (UDP), Hypertext Transfer Protocol (HTTP), File Transfer Protocol (FTP), ZigBee, EDGE, infrared (IR), IEEE 802.11, 802.16, cellular communication protocols, and/or Bluetooth (BT) communication protocols.

Examples of the network 107 may include, but is not limited to a wireless channel, a wired channel, a combination of wireless and wired channel thereof. The wireless or wired channel may be associated with a network standard which may be defined by one of a Local Area Network (LAN), a Personal Area Network (PAN), a Wireless Local Area Network (WLAN), a Wireless Sensor Network (WSN), Wireless Area Network (WAN), Wireless Wide Area Network (WWAN), a Long Term Evolution (LTE) network, a plain old telephone service (POTS), and a Metropolitan Area Network (MAN). Additionally, the wired channel may be selected on the basis of bandwidth criteria. For example, an optical fiber channel may be used for a high bandwidth communication. Further, a coaxial cable-based or Ethernet-based communication channel may be used for moderate bandwidth communication.

Some embodiments are based on the recognition that in order to determine the navigation route optimized for safety, the potential waypoints must be located at a prescribed angle and desired distance from the target so that the shallow waters and land are avoided during the navigation route.

To that end, the navigation planning apparatus 101 enables the user 105 to select the potential waypoint. The potential waypoint corresponds to potential positions, which can be adjusted or deleted based on the requirement in real time to determine an optimized navigation route. Thus, the navigation planning apparatus 101 enables the user 105 to adjust the location of the potential waypoint dynamically so that the potential waypoint is situated at a desired distance and angle from the target in order to determine the optimized navigation route. The location of the potential waypoint is adjusted by the user 105 on a user interface of the user device 103 of the navigation planning apparatus 101. Alternatively, the locations may be adjusted by the user 105 remotely by using the user device 103 which is connected to the navigation planning apparatus 101 via the network 107. For example, in the user device 103 that is configured with the touch screen display displaying the map, the position of the potential waypoint can be adjusted by dragging and dropping position of the potential waypoint on the map by using the touch screen display. A detailed analysis of the proposed navigation planning apparatus 101 is described below with respect to FIG. 1B.

Figure 1B:
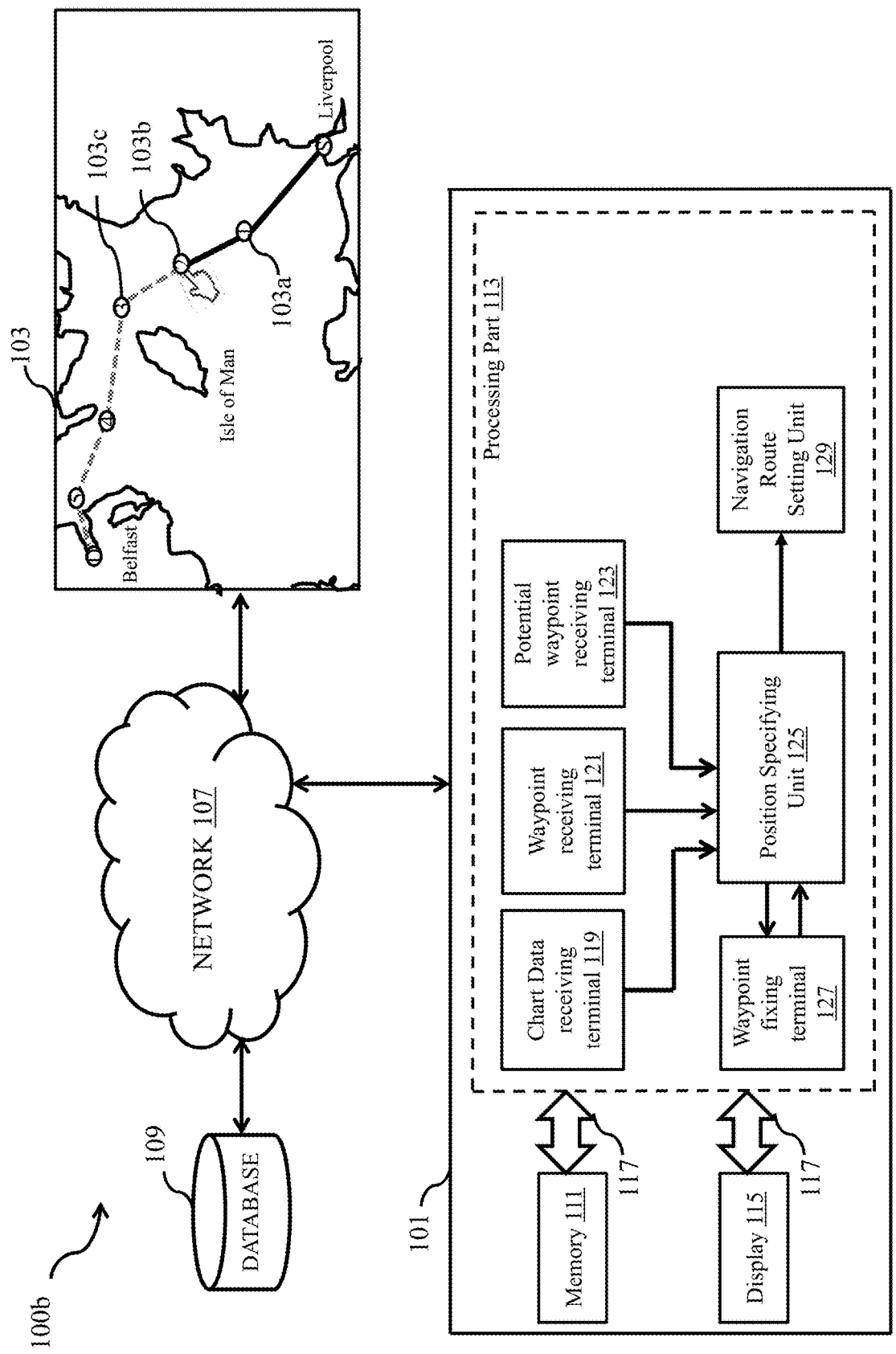
FIG. 1B illustrates a block diagram of the navigation planning apparatus, exemplarily illustrated in FIG. 1A, in accordance with an example embodiment.

FIG. 1B illustrates a block diagram 100b of the navigation planning apparatus 101, exemplarily illustrated in FIG. 1A, in accordance with an example embodiment. The navigation planning apparatus 101 includes a processing part 113 configured to execute stored instructions, as well as a memory 111 that stores instructions that are executable by the processing part 113. The memory 111 is further configured to store a chart data for navigation, where the chart data may comprise map of the water body, position information related to the plurality of targets, and other navigational information. The memory 111 can include random access memory (RAM), read only memory (ROM), flash memory, or any other suitable memory systems. The processing part 113 is connected through a bus 117 to the memory 111.

Further, the navigation planning apparatus 101 comprises a display 115, where the display 115 is configured to display chart information and position information of one or a plurality of targets. The display 115 is one or more of a touch screen display, and an Electronic Chart Display Information System (ECDIS) configured to receive at least one of touch based input and a mouse based input. The chart information may be present in the user device 103 and comprises a navigation start point S, a destination point D, a plurality of waypoints (103b, 103c, . . . , 103f) having a latest waypoint (103c), and a potential waypoint (not shown in Figure). The display 115 is further configured to receive the plurality of waypoints (103b, 103c, . . . , 103f) between the navigation start point S and the navigation destination point D. Further, the display 115 is configured to provide data obtained from the user 105 such as navigation start point, navigation destination point, plurality of waypoints (103b, 103c, . . . , 103f), latest waypoint (103c), potential waypoint, or the like to the processing part 113 via the bus 117.

The processing part 113 includes a chart data receiving terminal 119, a waypoint receiving terminal 121, a potential waypoint receiving terminal 123, a position specifying unit 125, a waypoint fixing terminal 127, and a navigation route setting unit 129 that outputs a navigation route. Further, different components of the processing part 113 are connected to the user device 103, where the application 103a may be run at the user device 103 to display sea map on the display screen of the user device 103. Further, the screen of the user device 103 may be the touch screen enabled to obtain inputs from the user 103.

The processing part 113 is configured to use the chart data receiving terminal 119, where the chart data receiving terminal 119 is configured to receive a chart data. The chart data includes position information of one or a plurality of targets. The plurality of targets may be a landmark object such as a light house, buoy, and the like. The processing part 113 is further configured to use the waypoint receiving terminal 121 to receive the plurality of waypoints (103b, 103c, . . . , 103f) including the latest waypoint (103c) for a navigation route of a movable body such as a vessel or an aircraft. The locations of the navigation start point S, the plurality of waypoints (103b, 103c, . . . , 103f), and the navigation destination point D may be specified, by the user 105, on the map displayed on the touch screen display panel of the display 115 by directly touching at the specific locations or moving a cursor on the display panel, or by inputting numerical data on the map. In another embodiment, the user 105 may use the user device 103 to remotely specify locations of the navigation start point S, the plurality of waypoints (103b, 103c, . . . , 103f), and the navigation destination point D on the map displayed on the touch screen of the user device 103. The plurality of waypoints (103*b*, 103*c*, . . . , 103*f*) comprises one or more previously selected waypoints, and the latest waypoint 103*c*.

The processing part 113 is configured to use the potential waypoint receiving terminal 123 to receive potential waypoints. The potential waypoint is provided by the user 105 through the user device 103 by touching a region of interest on the map displayed on the touch screen panel. The potential waypoint is movable on the map. The potential waypoint receiving terminal 123 is configured to receive position information of the potential waypoint when the potential waypoint is being moved.

Further, in order to determine the safest navigation route, a positional relationship between the latest waypoint 103*c*, the plurality of targets (not shown in figure) and the potential waypoint is required (not shown in figure).

To that end, the processing part 113 is configured to use the position specifying unit 125, where the position specifying unit 125 is configured to determine a position of the potential waypoint as a next waypoint following the latest waypoint 103*c*. The position specifying unit 125 receives a current position data of the potential waypoint from the potential waypoint receiving terminal 123, position information of the latest waypoint 103*c* from the waypoint receiving terminal 121.

Further, the position specifying unit 125 receives position information of the plurality of targets located within a predetermined distance from the potential waypoint from the chart data receiving terminal 119. Subsequently, the position specifying unit 125 calculates an angle between the latest waypoint 103*c*, the potential waypoint, and the plurality of targets. When the angle is equal to a predetermined value, the position specifying unit 125 provides an activation signal.

The waypoint fixing terminal 127 receives the activation signal and is configured to generate a waypoint fix signal upon receiving the activation signal. The waypoint fix signal is transmitted to the position specifying unit 125 where the position specifying unit 125 is further configured to transmit the waypoint fix signal to the navigation route setting unit 129.

Further, the display unit 115 is communicatively coupled with the navigation route setting unit 129, where the route setting unit 129 is configured to determine the navigation route by connecting the navigation start point S, one or more waypoints of the plurality of waypoints (103*b*, 103*c*, . . . , 103*f*), and the navigation destination point D. The route setting unit 129 uses the waypoint fix signal from the waypoint fixing terminal 127 to determine which potential waypoint should be connected with the latest waypoint of the plurality of waypoints (103*b*, 103*c*, . . . , 103*f*) in order to determine the safest navigation route. The navigation route optimized for safety is displayed on the display 115. In another embodiment, the optimized navigation route may be displayed on the user device 103. In some embodiments, the route setting unit 129 communicates directly with the user device 103 such as the ECDIS through the network 107 to determine the optimized navigation route.

Figure 2B:
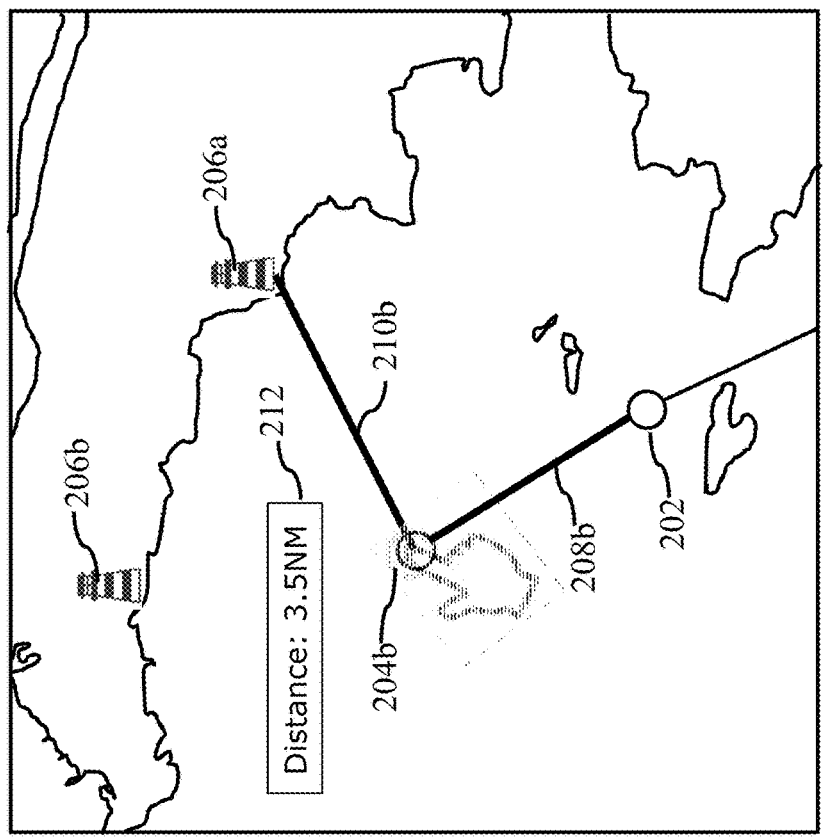
FIG. 2B illustrates a user interface displaying an activation signal when the position of the potential waypoint is determined, in accordance with an example embodiment.
Figure 2A:
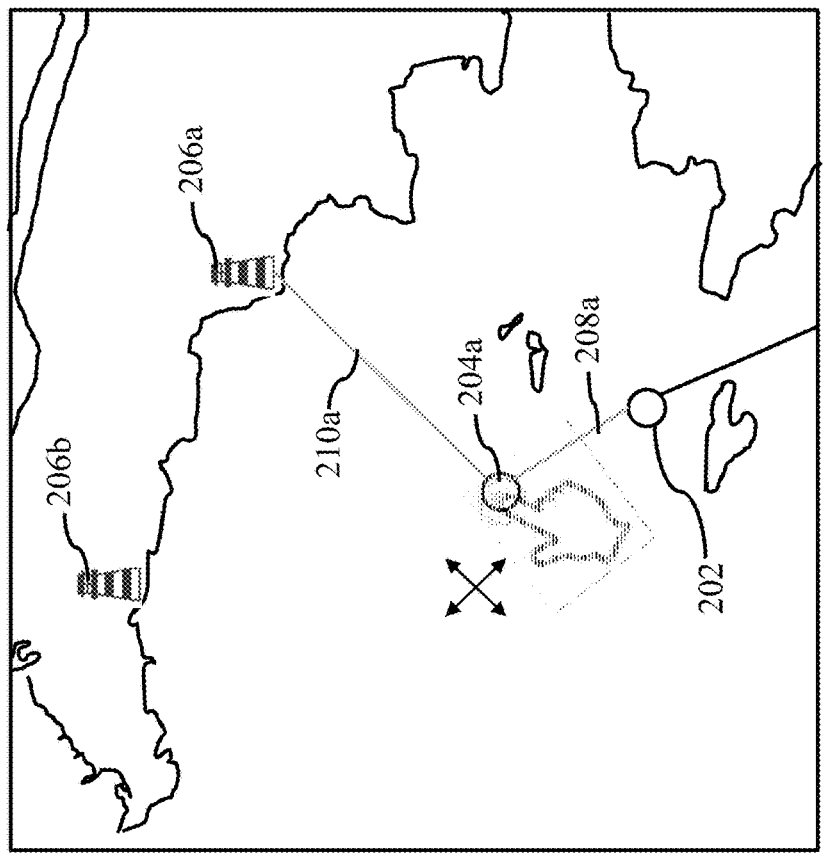
FIG. 2A illustrates a user interface, where the position of a potential waypoint is changed, in accordance with an example embodiment.

The user 105 inputs position data associated with the potential waypoint through the display 115 of the navigation planning apparatus 101. In another embodiment, the user 105 may input the position data associated with the potential waypoint through the user device 103. In both the cases, the user interface shown to the user 105 to receive the position data remains same. A detailed explanation associated with a user interface used by the user 105 to input different position data of the potential waypoint associated with the navigation route is explained below with respect to FIG. 2A-2B. FIG. 2A-2B explained below provides a detailed description of the user interface used to input position data of the potential waypoint either through the display 129 or the user device 103.

FIG. 2A illustrates a user interface, where the position of a potential waypoint 204*a* is changed, in accordance with an example embodiment. The user interface comprises a latest waypoint 202 that is part of the plurality of waypoints (103*b*, 103*c*, . . . , 103*f*), the potential waypoint 204*a*, and a plurality of targets 206*a*, 206*b*.

The latest waypoint 204*a* corresponds to the latest waypoint 103*c* in FIG. 1B. The user 105 may input the potential waypoint 204*a* and move the position of the potential waypoint 204*a* by touching at specific locations, moving the cursor on the display panel, or by inputting numerical data in the navigation map displayed on the user interface. The user interface further comprises a first bar 208*a* and a second bar 210*a*. The first bar 208*a* is a line connecting the latest waypoint 202 with the potential waypoint 204*a*. The second bar 210*a* is the line connecting the potential waypoint with the target 206*a*. When the potential waypoint 204*a* is moved, the first bar 208*a* and the second bar 210*a* moves along with the potential waypoint 204*a*. The first bar 208*a* and the second bar forms an angle that is calculated by the position specifying unit 125.

The position specifying unit 125 determines whether the angle formed by the first bar 208*a* and the second bar 210*a* is equal to a predetermined value. The predetermined value may be preset or dynamically set. In an embodiment, when the predetermined value is preset, the predetermined value is equal to 90 degrees. Further, the position specifying unit 125 calculates distance of the potential waypoint 204*a* from the target 206*a*. The position specifying unit 125 outputs an activating signal when the position of the potential waypoint 204*a* is located such that the angle between the first bar 208*a* and the second bar 210*a* is equal to the predetermined value as shown in FIG. 2B.

FIG. 2B illustrates a user interface displaying an activating signal when the position of the potential waypoint 204*b* is determined, in accordance with an example embodiment. When the angle between the first bar 208*a* and the second bar 210*a* is equal to the predetermined value of 90 degrees, the position specifying unit 125 outputs the activating signal. The activating signal is provided to the first bar 208*a* and the second bar 210*a*. The display 115 changes the display of the first bar from 208*a* to 208*b* and the second bar from 210*a* to 210*b* based on the activating signal. The display 115 changes one or more of color, contrast, thickness or aspect of the first bar (208) and the second bar (210) based on the activation signal as shown in 208*b* and 210*b*.

Further, the position specifying unit 125 calculates the distance of the potential waypoint 204*b* from the target 206*a*. The distance is calculated in nautical miles (NM). The calculated distance is displayed by the display 115 at 212, which is in an area near the potential waypoint 204*b*, as shown in FIG. 2B. The target 206*a* is selected from the plurality of targets 206*a*, 206*b* as shown in FIG. 3A-3B.

Figure 3B:
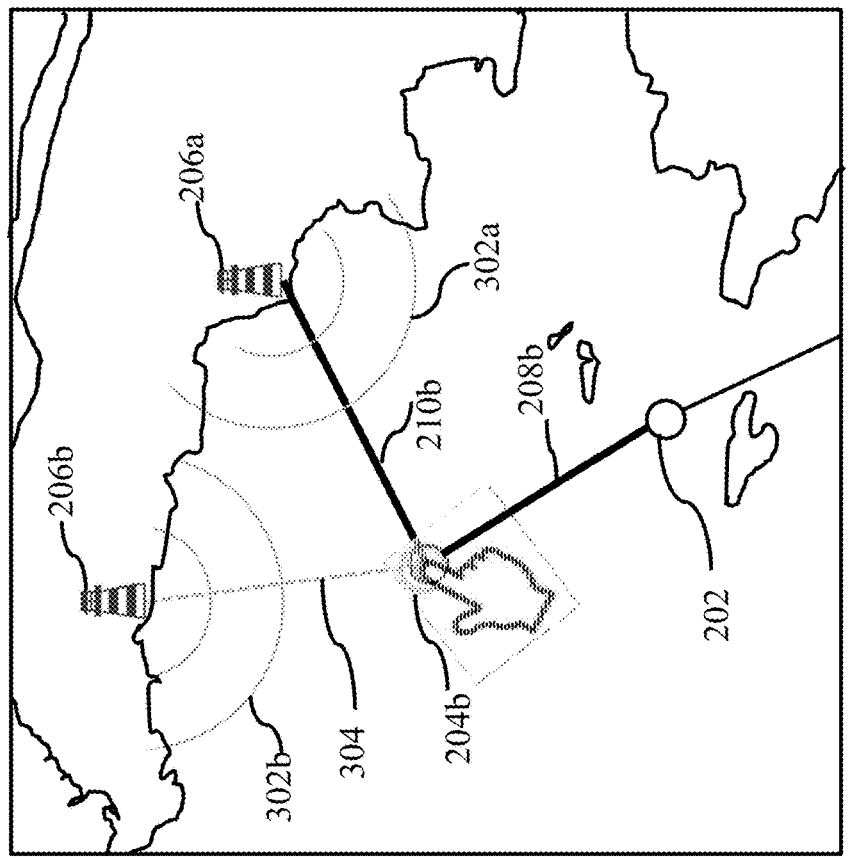
FIG. 3B illustrates a user interface displaying the activation signal along with the positional information of plurality of targets, in accordance with an example embodiment.
Figure 3A:
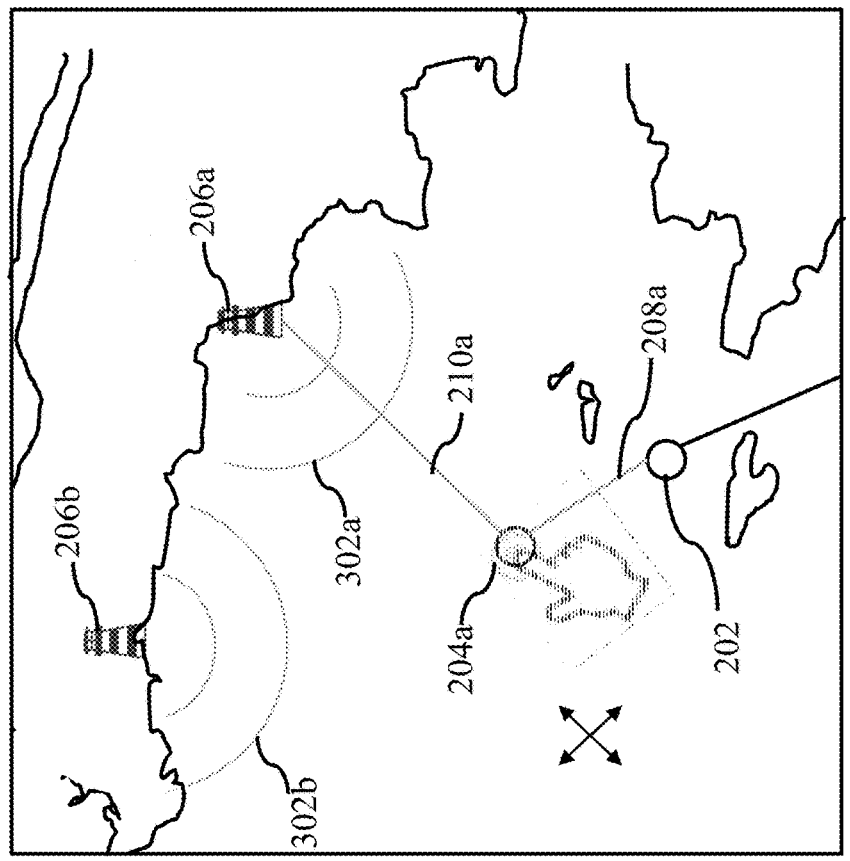
FIG. 3A illustrates a user interface displaying positional information of plurality of targets, in accordance with an example embodiment.

FIG. 3A illustrates a user interface displaying positional information of plurality of targets 206*a*, 206*b*, in accordance with an example embodiment. The positional information of the plurality of targets 206*a*, 206*b* further comprises a plurality of concentric half circles 302*a*, 302*b* arranged around the plurality of targets 206*b*, 206*a* respectively to indicate distance from the plurality of targets 206*b*, 206*a*. For example, the distance may be incremented by 1 NM at each half circle of the plurality of concentric half circles 302a, 302b. Therefore, the user 105 is aware of the approximate distance from the plurality of targets 206a, 206b based on the number of concentric half circles arranged around the plurality of targets 206a, 206b. When the potential waypoint 204a is selected by the user 105, the processing part 113 searches for the plurality of targets 206a, 206b that are present near the position of the potential waypoint 204a. The processing part 113 calculates the distance of the plurality of targets 206a, 206b from the potential waypoint 204a along with the angle to provide the activating signal as shown in FIG. 3B.

FIG. 3B illustrates a user interface displaying the activation signal along with the positional information of plurality of targets 206a, 206b in accordance with an example embodiment. The user interface comprises the latest waypoint 202, the potential waypoint 204b, and the plurality of targets 206a, 206b. When the user 105 selects the position of the potential waypoint 204b, the position specifying unit 125 of the processing part 113 is configured to search from the chart data, the plurality of targets 206a, 206b where the plurality of targets 206a, 206b includes one or more of a stationery landmark object and a moving object located within a predetermined distance from the potential waypoint 204b.

The stationery landmark object may include fixed objects such as a light house. The moving object may include objects such as a buoy that move on the water body. The position specifying unit 125 calculates the distance of the potential waypoint 204b from each of the plurality of targets 206a, 206b along with the angle. A dotted line 304 connecting the potential waypoint 204b with the target 206b is displayed by the display 115 indicating that the position specifying unit 125 takes into consideration, the distance and angle of the potential waypoint 204b from the target 206b in addition to calculating the angle of the potential waypoint 204b from the target 206a.

The position specifying unit 125 outputs the activating signal selecting the target at which the calculated angle is equal to a predetermined value. The activating signal is provided to the first bar 208a and the second bar 210a. The display 115 changes the display of the first bar from 208a to 208b and the second bar from 210a to 210b based on the activating signal. The display 115 changes one or more of color, contrast, thickness or aspect of the first bar (208) and the second bar (210) based on the activation signal as shown in 208b and 210b respectively. In addition to calculating the distance from the plurality of targets 206a, 206b, the navigation planning apparatus 101 also calculates the distance from the potential waypoint 204a, 204b based on the positional information as explained in FIG. 4A-4B.

Figure 4B:
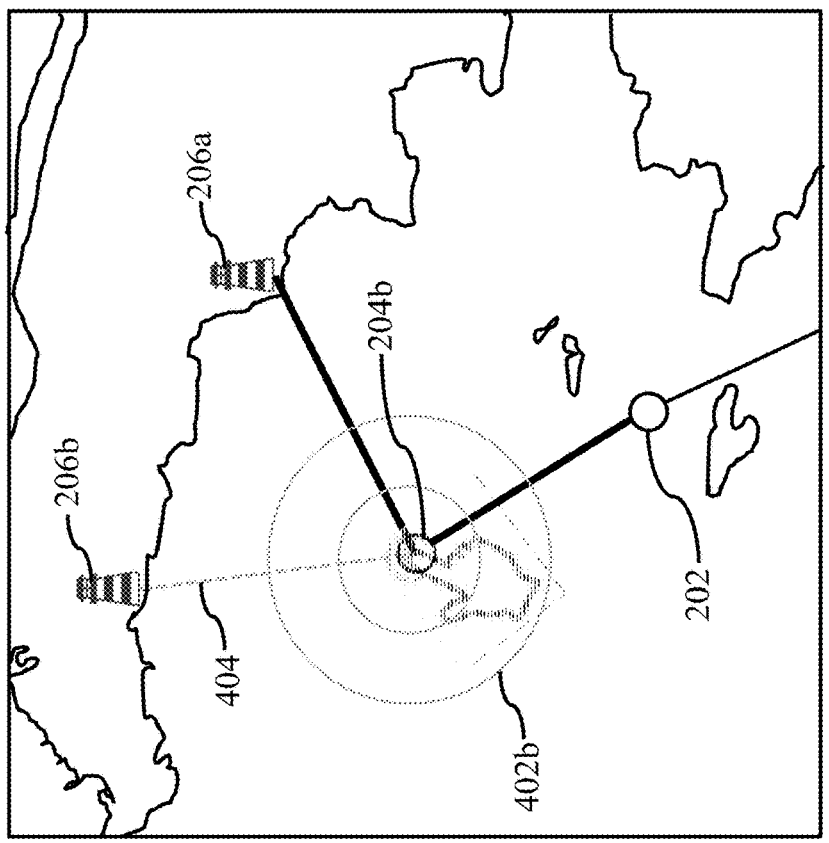
FIG. 4B illustrates a user interface displaying the activation signal along with the positional information of the potential waypoint, in accordance with an example embodiment.
Figure 4A:
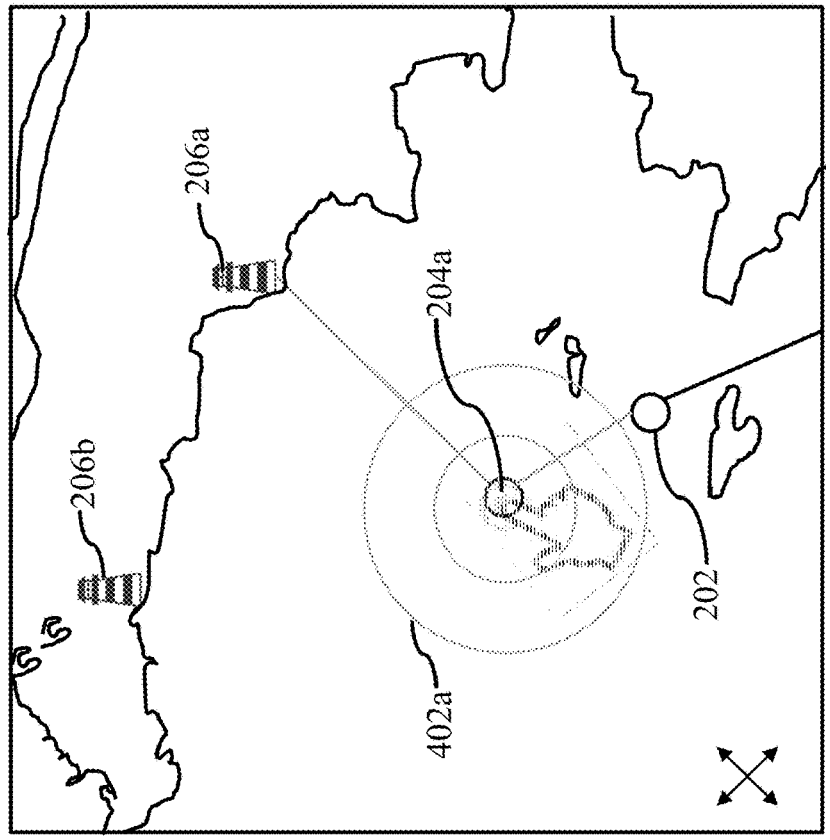
FIG. 4A illustrates a user interface displaying positional information of the potential waypoint, in accordance with an example embodiment.

FIG. 4A illustrates a user interface displaying a positional information of the potential waypoint 204a, in accordance with an example embodiment. The user interface comprises the latest waypoint 202, the potential waypoint 204a, and the plurality of targets 206a, 206b. The positional information of the potential waypoint 204a comprises a plurality of concentric full circles 402a arranged around the potential waypoint 204a to indicate distance from the potential waypoint 204a. For example, the distance may be incremented by 1 NM at each circle of the plurality of concentric full circles 402a. Therefore, the user 105 is aware of the approximate distance from the potential waypoint 204a based on the number of concentric circles arranged around the potential waypoint 204a. The processing part 113 calculates the distance of the plurality of targets 206a, 206b from the potential waypoint 204a along with the angle to provide the activating signal as shown in FIG. 4B.

FIG. 4B illustrates a user interface displaying the activation signal along with the positional information of a potential waypoint 204b, in accordance with an example embodiment. When the user 105 selects the position of the potential waypoint 204b, the position specifying unit 125 of the processing part 113 displays a plurality of concentric circles 402b around the potential waypoint 20b. Further, a dotted line 404 connecting the potential waypoint 204b with the target 206b is displayed by the display 115 indicating that the position specifying unit 125 takes into consideration, the distance and angle of the potential waypoint 204b from the target 206b in addition to calculating the distance and the angle of the potential waypoint 204b from the target 206a. The calculation of the angle by the position specifying unit 125 is explained in FIG. 5A-5B below.

Figure 5B:
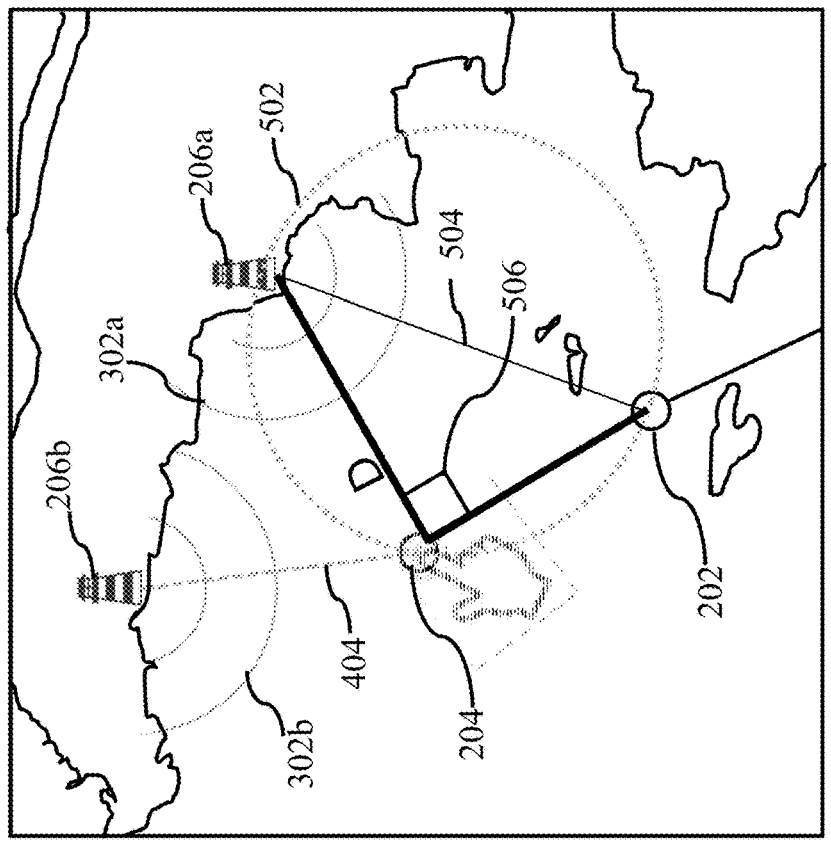
FIG. 5B illustrates a user interface displaying the activation signal along with the plurality of dots arranged to form a first circle, in accordance with an example embodiment.
Figure 5A:
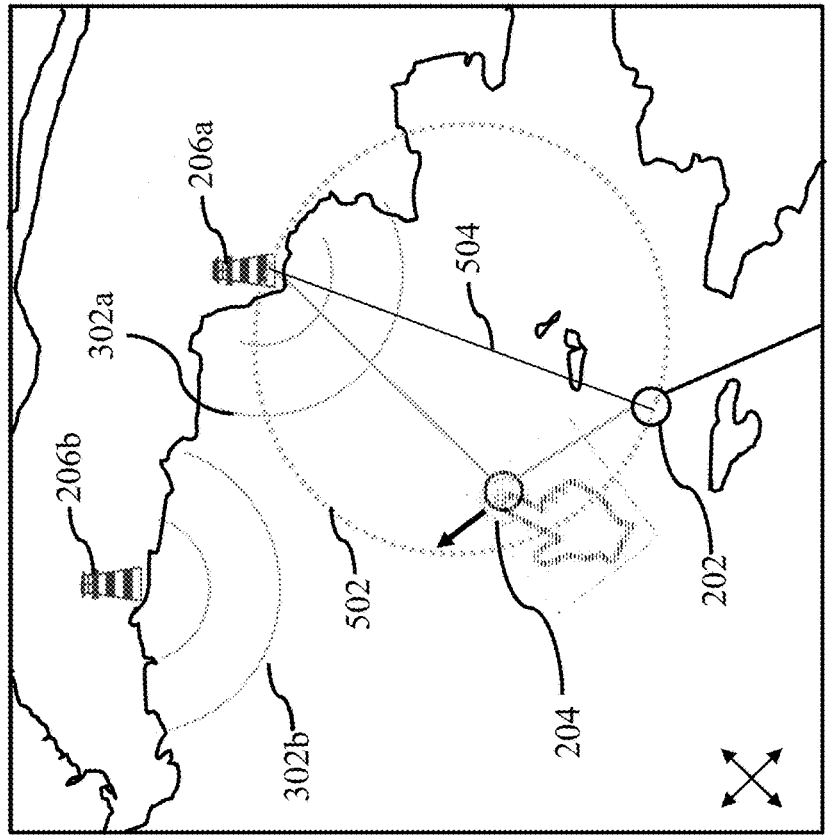
FIG. 5A illustrates a user interface displaying plurality of dots arranged to form a first circle, in accordance with an example embodiment.

FIG. 5A illustrates a user interface displaying a plurality of dots arranged to form a first circle 502, in accordance with an example embodiment. The user interface further comprises the latest waypoint 202, the potential waypoint 204, the plurality of targets 206a, 206b, and a line 504. The line 504 corresponds to a diameter of the first circle 502.

When the user 105 inputs the potential waypoint 204, the position specifying unit 125 is configured to calculate an intersection position of two circles, where the first circle 502 is having the diameter of the line 504 connecting the target 206a and the latest waypoint 202, and second circle is the plurality of half circles 302a, 302b having a radius of a given distance around the target 206a. The position specifying unit 125 is further configured to output the calculated intersection position to indicate the distance between the potential waypoint 204 and the target 206a.

Further, the position of the potential waypoint 204 is located on circumference of the first circle 502. When the position of the potential waypoint 204 is moved, the diameter 504 of the first circle 502 varies according to the change in position of the potential waypoint 204. Further, as the potential waypoint is located at the circumference of the first circle 502, the position specifying unit 125 implements Thales' theorem in determining the position of the potential waypoint 204 that is at an angle of 90 degrees from the target 206a as explained in FIG. 5B.

FIG. 5B illustrates a user interface displaying the activation signal along with the plurality of dots arranged to form the first circle 502, in accordance with an example embodiment. The position specifying unit 125 calculates the distance and angle between the potential waypoint 204 and the target 206b as denoted by dotted line 404. The position specifying unit 125 also calculates the distance and angle 506 between the potential waypoint 204 and the target 206a. The activating signal is outputted by the position specifying unit 125 when the angle 506 of the potential waypoint 204 is equal to the predetermined value. The predetermined value is pre-set or dynamically set by the user 105. In an embodiment, when the predetermined value is pre-set, the predetermined value is equal to 90 degrees.

The position specifying unit 125 provides the activating signal to the first bar connecting the latest waypoint 202 with the potential waypoint 204 and the second bar connecting the potential waypoint 204 with the target 206a. As shown in FIG. 5B, the potential waypoint 204 is perpendicular to the target 206a. Subsequently, the display 115 is configured to change one or more of color, contrast, thickness or aspect of the line connecting the potential waypoint 204 with the target 206a based on the activation signal.

Further, the waypoint fixing terminal 121 is configured to generate a waypoint fix signal upon receiving the activating signal. The waypoint fixing terminal 121 is configured to add the potential waypoint 204 to the navigation route based on the waypoint fix signal. In this way, the potential waypoint 204 that is perpendicular to the target 206a.

Figure 6:
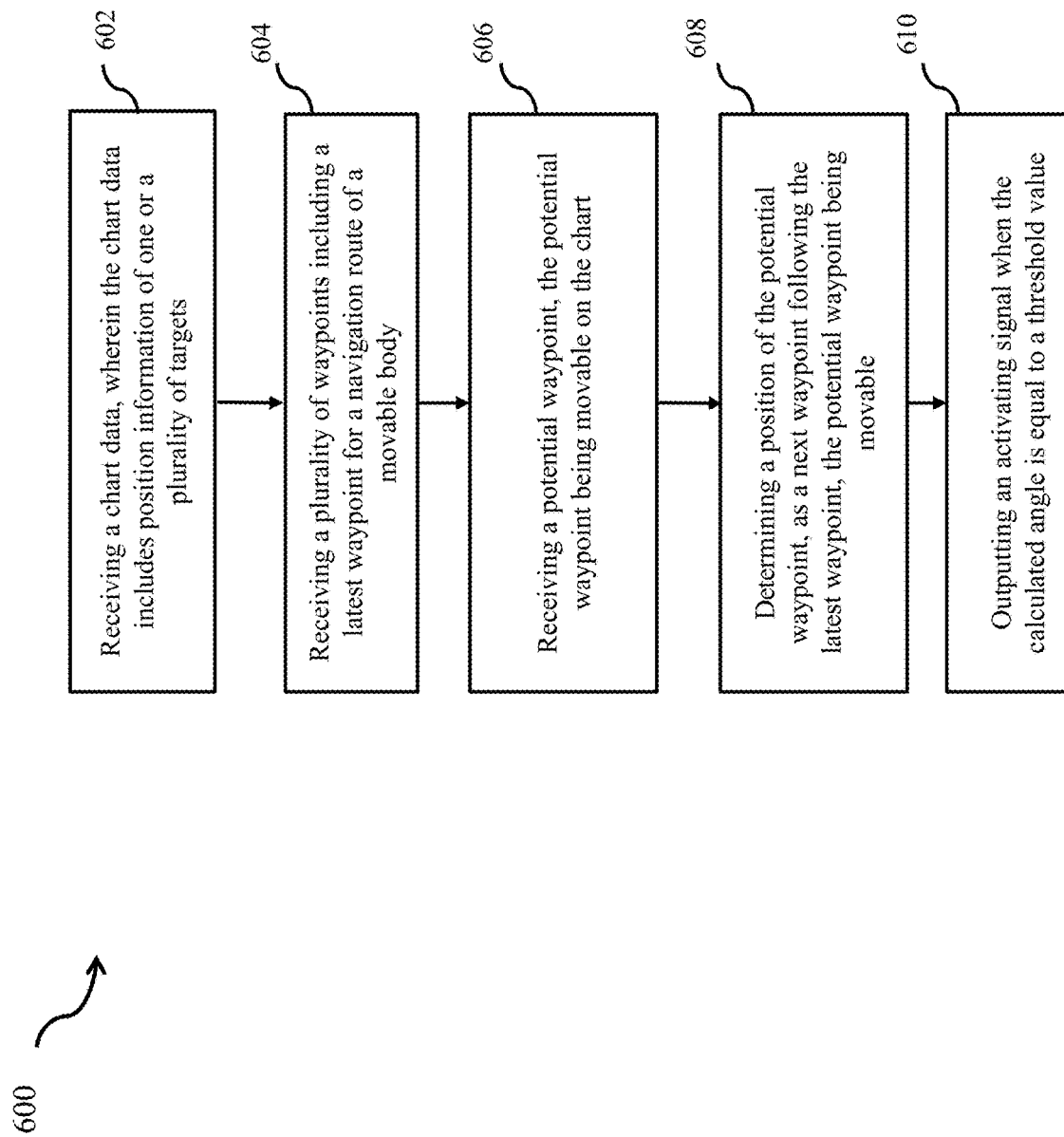
FIG. 6 is a flowchart that illustrates steps of a navigation planning method executed by the navigation planning apparatus, in accordance with an example embodiment.

FIG. 6 is a flowchart that illustrates steps of a navigation planning method 600 executed by the navigation planning apparatus 101, in accordance with an example embodiment.

At step 602, a chart data is received by the chart data receiving terminal 119. The chart data includes position information of one or a plurality of targets 206a, 206b. The plurality of targets 206a, 206b are pre-loaded in the chart data. Further, the user 105 may also enter information related to the plurality of targets 206a, 206b during navigation. The chart data is stored in the database 109 and is communicatively coupled to the navigation planning apparatus 101. In an embodiment the chart data may be stored in a memory 111 of the navigation planning apparatus 101.

At step 604, a plurality of waypoints (103b, 103c, ..., 103f) for a navigation route of a movable body is received. The movable body is a vessel or an aircraft. The plurality of waypoints (103b, 103c, ..., 103f) includes a latest waypoint 202. The plurality of waypoints (103b, 103c, ..., 103f) are received by the waypoint receiving terminal 121.

At step 606, a potential waypoint 204 is received by the potential waypoint receiving terminal 123. The potential waypoint 204 is being movable on the chart. The potential waypoint 204 is moved on the chart by the user 105 by touching locations of interest in the chart.

At step 608, a position of the potential waypoint 204, as a next waypoint following the latest waypoint 202 is determined by the position specifying unit 125. The determination of the position of the potential waypoint 204 is explained in FIG. 7.

At step 610, an activating signal is outputted by the position specifying unit 125 when the calculated angle is equal to a predetermined value. The activating signal ensures that the potential waypoint is added to the navigation route of the movable body such as a vessel or an aircraft.

Figure 7:
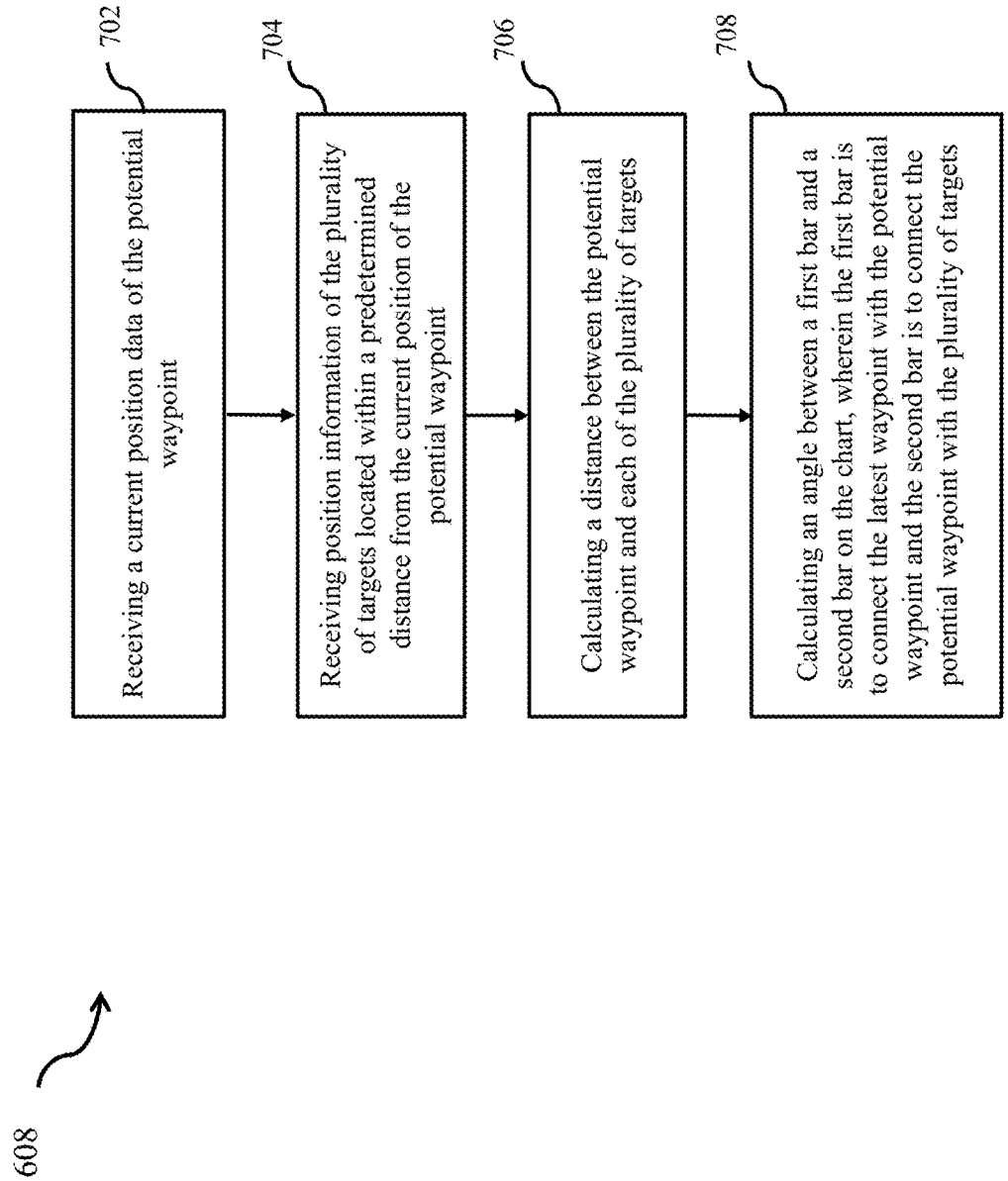
FIG. 7 is a flowchart that illustrates steps for determining position of potential waypoint executed by a position specifying unit, in accordance with an example embodiment.

FIG. 7 is a flowchart that illustrates steps for determining position of potential waypoint 204 executed by the position specifying unit 125, in accordance with an example embodiment.

At step 702, a current position data of the potential waypoint 204 is received by the position specifying unit 125 from the potential waypoint receiving terminal 123.

At step 704, position information of the plurality of targets 206a, 206b located within a predetermined distance from the current position of the potential waypoint 204 is received by the position specifying unit 125 from the chart data receiving terminal 119.

At step 706, a distance between the potential waypoint 204 and each of the plurality of targets 206a, 206b is calculated by the position specifying unit 125.

At step 708, an angle between a first bar 208 and a second bar 210 on the chart is calculated by the position specifying unit 125 where the first bar 208 is to connect the latest waypoint 202 with the potential waypoint 204 and the second bar 210 is to connect the potential waypoint 202 with the plurality of targets 206a, 206b. The angle between the potential waypoint 204 and the target 206a is calculated by implementing the Thales theorem.

Example embodiments of the present application may thus provide for the navigation planning apparatus 101 and the navigation planning method 600 that ensure accurate and easy selection of the potential waypoint 204 so as to determine the navigation route for a movable body such as a vessel or an aircraft that is optimized for safety. To that end, the navigation planning apparatus 101 receives a chart data, wherein the chart data includes position information of one or a plurality of targets 206a, 206b. The navigation planning apparatus 101 receives a plurality of waypoints (103b, 103c, ..., 103f) including a latest waypoint 202 for a navigation route of the movable body. Further, the navigation planning apparatus 101 receives a potential waypoint 204, the potential waypoint 204 being movable on the chart, where the navigation planning apparatus 101 is characterized by determining a position of the potential waypoint 204, as a next waypoint following the latest waypoint 202, the potential waypoint 204 being movable. The potential waypoint 204 is determined by receiving a current position data of the potential waypoint 204, receiving position information of the plurality of targets 206a, 206b located within a predetermined distance from the current position of the potential waypoint 204, calculating a distance between the potential waypoint 204 and each of the plurality of targets 206a, 206b, calculating an angle 506 between a first bar 208 and a second bar 210 on the chart, where the first bar 208 is to connect the latest waypoint 202 with the potential waypoint 204 and the second bar 210 is to connect the potential waypoint 204 with the plurality of targets 206a, 206b, and outputting an activating signal when the calculated angle is equal to a predetermined value.

Many modifications and other embodiments of the applications set forth herein will come to mind of one skilled in the art to which these applications pertain having the benefit of the teachings presented in the foregoing descriptions and the associated drawings. Therefore, it is to be understood that the applications are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A navigation planning apparatus comprising:
 a display; and
 processing circuitry configured to:
  display a chart on the display;
  receive chart data, the chart data including position information of a target;
  display the target on the chart based on the position information of the target;
  receive a plurality of waypoints, including a latest waypoint, of a navigation route of a movable body that has the navigation planning apparatus installed therein;
  display the plurality of waypoints of the navigation route on the chart;
  receive and display a potential waypoint as a next waypoint that potentially follows the latest waypoint in the navigation route, the displayed potential waypoint being movable by a user on the chart;
  determine and display a position of the potential waypoint while moving the potential waypoint on the chart;

while the user is moving the potential waypoint on the chart, calculate an angle between a first bar and a second bar that are displayed on the chart, wherein the first bar connects the latest waypoint with the potential waypoint that is being moved on the chart, and the second bar connects the potential waypoint that is being moved on the chart with the target;

when the calculated angle is equal to a predetermined value, output an activating signal; and change the display of the first and second bars based on the activating signal.

2. The navigation planning apparatus of claim 1, wherein the predetermined value is equal to 90 degrees.

3. The navigation planning apparatus of claim 1, wherein the processing circuitry is further configured to:

generate a waypoint fix signal upon receiving the activating signal; and based on the waypoint fix signal, add the potential waypoint to the navigation route that is displayed on the chart.

4. The navigation planning apparatus of claim 1, wherein the movable body is a water vessel or an aircraft, the navigation route is a corresponding water or air navigation route, and the target comprises a stationery object on land.

5. The navigation planning apparatus of claim 4, wherein the display of the target comprises a plurality of concentric half circles arranged around the target to indicate a corresponding plurality of distances from the target.

6. The navigation planning apparatus of claim 1, wherein the display of the potential waypoint comprises a plurality of concentric circles arranged around the potential waypoint to indicate a corresponding plurality of distances from the potential waypoint.

7. The navigation planning apparatus of claim 1, wherein, the processing circuitry is further configured to display, on the chart, first and second circles along with an intersection point of the first and second circles, wherein the first circle is a circle having a diameter of a line connecting the target and the latest waypoint, and the second circle is a circle having a radius of a given distance around the target.

8. The navigation planning apparatus of claim 1, wherein the target is displayed on the chart when the position information of the target indicates that the target is located within a predetermined distance from the current position of the potential waypoint.

9. The navigation planning apparatus of claim 8, wherein the processing circuitry is further configured to calculate and display a distance between the target and the potential waypoint when the calculated angle is equal to 90 degrees.

10. The navigation planning apparatus of claim 8, wherein the processing circuitry is further configured to change one or more of color, contrast, thickness or aspect of the first bar or the second bar based on the activation signal.

11. The navigation planning apparatus of claim 8, wherein the display of the position of the potential waypoint includes a display of a circle, and wherein a circumference of the circle connects the potential waypoint with the target.

12. The navigation planning apparatus of claim 8, wherein the display is configured to display a plurality of concentric half circles around the target.

13. The navigation planning apparatus of claim 8, wherein, the processing circuitry is further configured to display first and second circles, part or all of each, wherein the first circle is a circle having a diameter of a line connecting the target and the latest waypoint, and the second circle is a circle having a radius of a given distance around the target, and the processing circuitry further configured to output an intersection position of the first and second circles.

14. The navigation planning apparatus of claim 8, wherein the display is one or more of a touch screen display or an Electronic Chart Display Information System (ECDIS) configured to receive at least one of a touch based input or a mouse based input.

15. A navigation planning method performed by a navigation planning apparatus having a display, the navigation planning method comprising displaying a chart on the display;

receiving chart data, wherein the chart data includes position information of a target;

displaying the target on the chart based on the position information of the target;

receiving a plurality of waypoints including a latest waypoint for a navigation route of a movable body that has the navigation planning apparatus installed therein;

displaying the plurality of waypoints of the navigation route on the chart;

receiving and displaying a potential waypoint as a next waypoint that potentially follows the latest waypoint in the navigation route, the displayed potential waypoint being movable by a user on the chart; and determining and displaying a position of the potential waypoint while moving the potential waypoint on the chart;

while the user is moving the potential waypoint on the chart, calculating an angle between a first bar and a second bar that are displayed on the chart, wherein the first bar connects the latest waypoint with the potential waypoint that is being moved on the chart, and the second bar connects the potential waypoint that is being moved on the chart with the target;

when the calculated angle is equal to 90 degrees, outputting an activating signal; and changing the display of the first and second bars based on the activating signal.

16. The navigation planning method of claim 15, further comprising:

generating, a waypoint fix signal upon receiving the activating signal; and based on the waypoint fix signal, adding the potential waypoint to the navigation route.

17. The navigation planning method of claim 15, wherein the movable body is a water vessel or an aircraft, the navigation route is a corresponding water or air navigation route, and the target comprises a stationery object on land.

18. The navigation planning method of claim 15, further comprising:

displaying, on the chart, first and second circles along with an intersection point of the first and second circles; and wherein first circle is a circle having a diameter of a line connecting the target and the latest waypoint, and the second circle is a circle having a radius of a given distance around the target.

19. A non-transitory computer readable medium storing instructions that, when executed by one or more processors, cause a computing apparatus to operate as a navigation planning apparatus and to perform a method that comprises:

displaying a chart on a display;
receiving chart data, wherein the chart data includes position information of a target;
displaying the target on the chart based on the position information of the target;
receiving a plurality of waypoints including a latest waypoint for a navigation route of a movable body that has the navigation planning apparatus installed therein;
displaying the plurality of waypoints of the navigation route on the chart;
receiving and displaying a potential waypoint as a next waypoint that potentially follows the latest waypoint in the navigation route, the displayed potential waypoint being movable by a user on the chart; and
determining and displaying a position of the potential waypoint while moving the potential waypoint on the chart;
while the user is moving the potential waypoint on the chart, calculating an angle between a first bar and a second bar that are displayed on the chart,
wherein the first bar connects the latest waypoint with the potential waypoint that is being moved on the chart, and the second bar connects the potential waypoint that is being moved on the chart with the target;
when the calculated angle is equal to 90 degrees, outputting an activating signal; and
changing the display of the first and second bars based on the activating signal.

* * * * *